US012645947B2

(12) United States Patent
Yang

(10) Patent No.: US 12,645,947 B2
(45) Date of Patent: Jun. 2, 2026

(54) METHOD, SYSTEM, AND COMPUTER PROGRAM PRODUCT FOR USE OF REINFORCEMENT LEARNING TO INCREASE MACHINE LEARNING MODEL LABEL ACCURACY

(71) Applicant: Visa International Service Association, San Francisco, CA (US)

(72) Inventor: Pei Yang, Austin, TX (US)

(73) Assignee: Visa International Service Association, San Francisco, CA (US)

( * ) Notice: Subject to any disclaimer, the term of this patent is extended or adjusted under 35 U.S.C. 154(b) by 70 days.

(21) Appl. No.: 18/845,939

(22) PCT Filed: Nov. 22, 2023

(86) PCT No.: PCT/US2023/080862
§ 371 (c)(1),
(2) Date: Sep. 11, 2024

(87) PCT Pub. No.: WO2025/110999
PCT Pub. Date: May 30, 2025

(65) Prior Publication Data
US 2025/0363379 A1 Nov. 27, 2025

(51) Int. Cl.
*G06N 3/092* (2023.01)
*G06N 3/09* (2023.01)
*G06Q 20/40* (2012.01)

(52) U.S. Cl.
CPC ............... *G06N 3/092* (2023.01); *G06N 3/09* (2023.01); *G06Q 20/4016* (2013.01)

(58) Field of Classification Search
CPC .......... G06N 3/092; G06N 3/09; G06N 3/006; G06N 3/02; G06N 3/042; G06N 3/045;
(Continued)

(56) References Cited

U.S. PATENT DOCUMENTS

| | | |
|---|---|---|
| 11,107,085 B2 | 8/2021 | Ivakhnenko |
| 11,496,501 B1 | 11/2022 | Liu et al. |

(Continued)

FOREIGN PATENT DOCUMENTS

| | | |
|---|---|---|
| CN | 110263979 A | 9/2019 |
| CN | 114387074 A | 4/2022 |
| CN | 116802648 A | 9/2023 |

OTHER PUBLICATIONS

Yoon et al. ("Data Valuation using Reinforcement Learning", PMLR 119, 2020) (Year: 2020).*

(Continued)

*Primary Examiner* — Imad Kassim
(74) *Attorney, Agent, or Firm* — The Webb Law Firm

(57) ABSTRACT

Provided are methods that include receiving an initial training dataset, where each data instance of the initial training dataset has a label and a first percentage of the plurality of data instances are labeled correctly, providing the initial training dataset as an input to a reinforcement learning agent (RLA) machine learning model to generate a second training dataset, where a second percentage of data instances of the second training dataset are labeled correctly and the second percentage is greater than the first percentage, training a deep learning model using the second training dataset to provide a trained deep learning model, testing the trained deep learning model using a testing dataset to generate a resultant dataset that has a detection rate, which is an indication of a number of data instances that were predicted correctly, and generating a reward parameter. Systems and computer program products are also disclosed.

20 Claims, 9 Drawing Sheets

(58) Field of Classification Search
CPC ........ G06N 3/08; G06N 3/0895; G06N 20/20;
G06Q 20/4016
See application file for complete search history.

(56)                    References Cited

U.S. PATENT DOCUMENTS

| | | |
|---|---|---|
| 11,544,471 B2 | 1/2023 | Belem et al. |
| 2018/0314975 A1 | 11/2018 | Zang et al. |
| 2020/0364625 A1 | 11/2020 | Baker et al. |
| 2022/0114345 A1* | 4/2022 | Belém ..................... G06F 40/30 |
| 2022/0318621 A1 | 10/2022 | Gong et al. |

OTHER PUBLICATIONS

Xiang et al. ("Interactive Correction of Mislabeled Training Data",
2019) (Year: 2019).*

* cited by examiner

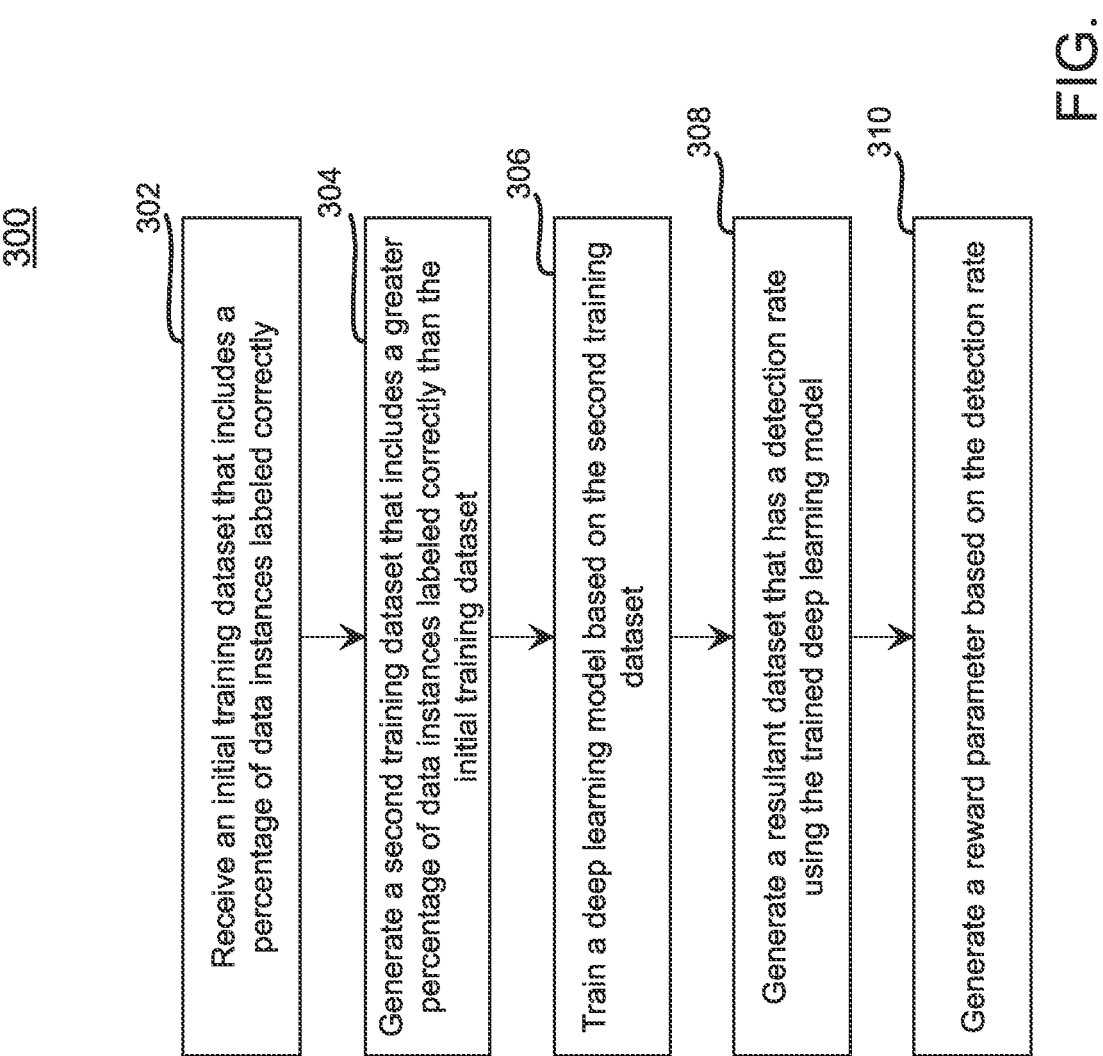

300

302 Receive an initial training dataset that includes a percentage of data instances labeled correctly 304 Generate a second training dataset that includes a greater percentage of data instances labeled correctly than the initial training dataset 306 Train a deep learning model based on the second training dataset 308 Generate a resultant dataset that has a detection rate using the trained deep learning model 310 Generate a reward parameter based on the detection rate

Initial Training Dataset

| R00 Label = F |
| R01 Label = F |
| R02 Label = F |
| ... |
| R19 Label = F |
| R20 Label = NF |
| R21 Label = NF |
| R22 Label = NF |
| R23 Label = NF |

Data Source 102a

Reinforcement Learning System 102

405
Receive an initial training dataset, that includes a plurality of data instances

400

Resultant Dataset

| R80 Label = F |
| R81 Label = F |
| R82 Label = NF |
| R83 Label = NF |
| R84 Label = F |
| R85 Label = NF |
| R86 Label = NF |
| R87 Label = F |
| R88 Label = F |
| R90 Label = F |

Detection Rate = .6

Reward Parameter

425
Generate a reward parameter based on the detection rate of the resultant dataset Reinforcement Learning System
102

METHOD, SYSTEM, AND COMPUTER PROGRAM PRODUCT FOR USE OF REINFORCEMENT LEARNING TO INCREASE MACHINE LEARNING MODEL LABEL ACCURACY

CROSS-REFERENCE TO RELATED APPLICATION

This application is the United States national phase of International Patent Application No. PCT/US23/80862 filed Nov. 22, 2023, the disclosure of which is hereby incorporated by reference in its entirety.

BACKGROUND

1. Technical Field

The disclosed subject matter relates generally to methods, systems, and computer program products for increasing accuracy of machine learning models and, in some particular embodiments or aspects, to methods, systems, and computer program products for the use of reinforcement learning to increase machine learning model label accuracy.

2. Technical Considerations

Machine learning may be a field of computer science that uses statistical techniques to provide a computer system with the ability to learn (e.g., to progressively improve performance of) a task with data without the computer system being explicitly programmed to perform the task. In some instances, a machine learning model may be developed for a set of data so that the machine learning model may perform a task (e.g., a task associated with a prediction) with regard to the set of data. In one example, a machine learning model may be developed to identify fraudulent transactions (e.g., fraudulent payment transactions). In some instances, the machine learning model may include a fraud detection machine learning model that is used to determine whether a transaction from a set of transactions is a fraudulent transaction based on data associated with the set of transactions.

In some instances, a machine learning model may be used to classify an outcome with regard to a condition or an event. For example, a machine learning model may be used to predict whether a transaction is fraudulent. In such an example, a prediction provided by the machine learning model may include a probability that the occurrence of the condition will take place, where the probability has been generated based on the machine learning model being trained on a large dataset. Ultimately, the predictions of the machine learning model may be compared to ground truth values that are actual (e.g., real, true, etc.) situations where a transaction is fraudulent.

However, the machine learning model may fail to accurately predict whether a transaction is fraudulent if a training dataset includes too few or too many incorrect predictions, such as a false positive prediction (e.g., a positive outcome that the machine learning model predicted incorrectly) or a false negative prediction (e.g., a negative outcome that the machine learning model predicted incorrectly). In some instances, a false positive prediction and/or a false negative prediction may be an inaccurate prediction based on the particular use of the machine learning model. Furthermore, false positive predictions and false negative predictions may result in large inaccuracies with large datasets which are difficult to eliminate, and necessary network resources may be required in order to eliminate such incorrect predictions.

SUMMARY

Accordingly, provided are improved methods, systems, and computer program products for use of reinforcement learning to increase machine learning model label accuracy.

According to non-limiting embodiments or aspects, provided is a computer-implemented method for the use of reinforcement learning to increase machine learning model label accuracy, including comprising: receiving, with at least one processor, an initial training dataset, wherein the initial training dataset comprises a plurality of data instances, wherein each data instance has a label, and wherein a first percentage of the plurality of data instances are labeled correctly; providing, with at least one processor, the initial training dataset as an input to a reinforcement learning agent (RLA) machine learning model to generate a second training dataset, wherein the second training dataset comprises the plurality of data instances, wherein a second percentage of the plurality of data instances are labeled correctly, and wherein the second percentage is greater than the first percentage; training, with at least one processor, a deep learning model using the second training dataset to provide a trained deep learning model; testing, with at least one processor, the trained deep learning model using a testing dataset to generate a resultant dataset, wherein the resultant dataset has a detection rate, and wherein the detection rate is an indication of a number of data instances from the testing dataset that were predicted correctly by the trained deep learning model; and generating, with at least one processor, a reward parameter based on the detection rate of the resultant dataset generated using the trained deep learning model.

According to non-limiting embodiments or aspects, provided is a system for the use of reinforcement learning to increase machine learning model label accuracy, including at least one processor configured to: receive an initial training dataset, wherein the initial training dataset comprises a plurality of data instances, wherein each data instance has a label, and wherein a first percentage of the plurality of data instances are labeled correctly; provide the initial training dataset as an input to a reinforcement learning agent (RLA) machine learning model to generate a second training dataset, wherein the second training dataset comprises the plurality of data instances, wherein a second percentage of the plurality of data instances are labeled correctly, and wherein the second percentage is greater than the first percentage; train a deep learning model using the second training dataset to provide a trained deep learning model; test the trained deep learning model using a testing dataset to generate a resultant dataset, wherein the resultant dataset has a detection rate, and wherein the detection rate is an indication of a number of data instances from the testing dataset that were predicted correctly by the trained deep learning model; and generate a reward parameter based on the detection rate of the resultant dataset.

According to non-limiting embodiments or aspects, provided is a computer program product for the use of reinforcement learning to increase machine learning model label accuracy, the computer program product including at least one non-transitory computer-readable medium including one or more instructions that, when executed by at least one processor, cause the at least one processor to receive an initial training dataset, wherein the initial training dataset comprises a plurality of data instances, wherein each data instance has a label, and wherein a first percentage of the plurality of data instances are labeled correctly; provide the initial training dataset as an input to a reinforcement learning agent (RLA) machine learning model to generate a second training dataset, wherein the second training dataset comprises the plurality of data instances, wherein a second percentage of the plurality of data instances are labeled correctly, and wherein the second percentage is greater than the first percentage; train a deep learning model using the second training dataset to provide a trained deep learning model; test the trained deep learning model using a testing dataset to generate a resultant dataset, wherein the resultant dataset has a detection rate, and wherein the detection rate is an indication of a number of data instances from the testing dataset that were predicted correctly by the trained deep learning model; and generate a reward parameter based on the detection rate of the resultant dataset.

Further non-limiting embodiments or aspects are set forth in the following numbered clauses:

Clause 1: A computer-implemented method comprising: receiving, with at least one processor, an initial training dataset, wherein the initial training dataset comprises a plurality of data instances, wherein each data instance has a label, and wherein a first percentage of the plurality of data instances are labeled correctly; providing, with at least one processor, the initial training dataset as an input to a reinforcement learning agent (RLA) machine learning model to generate a second training dataset, wherein the second training dataset comprises the plurality of data instances, wherein a second percentage of the plurality of data instances are labeled correctly, and wherein the second percentage is greater than the first percentage; training, with at least one processor, a deep learning model using the second training dataset to provide a trained deep learning model; testing, with at least one processor, the trained deep learning model using a testing dataset to generate a resultant dataset, wherein the resultant dataset has a detection rate, and wherein the detection rate is an indication of a number of data instances from the testing dataset that were predicted correctly by the trained deep learning model; and generating, with at least one processor, a reward parameter based on the detection rate of the resultant dataset generated using the trained deep learning model.

Clause 2: The computer-implemented method of clause 1, further comprising: training the RLA machine learning model using a reinforcement based learning algorithm based on the reward parameter.

Clause 3: The computer-implemented method of clauses 1 or 2, wherein training the RLA machine learning model using the reinforcement based learning algorithm comprises: updating the RLA machine learning model to maximize the reward parameter generated by the trained deep learning model.

Clause 4: The computer-implemented method of any of clauses 1-3, wherein a plurality of data instances of the testing dataset are independent of the plurality of data instances of the initial training dataset.

Clause 5: The computer-implemented method of any of clauses 1-4, wherein the RLA machine learning model comprises a neural network machine learning model.

Clause 6: The computer-implemented method of any of clauses 1-5, wherein the plurality of data instances of the initial training dataset comprises a plurality of data records associated with a plurality of payment transactions; wherein each data record has a label indicating whether the data record is associated with a payment transaction that is fraudulent or associated with a payment transaction that is non-fraudulent; and wherein the deep learning model is a fraud detection deep learning model that is configured to provide a prediction of whether a payment transaction is fraudulent or non-fraudulent.

Clause 7: The computer-implemented method of any of clauses 1-6, wherein a plurality of data instances of the testing dataset comprises a second plurality of data records associated with a second plurality of payment transactions; wherein a subset of data records of the second plurality of data records has a label indicating that each data record of the subset of data records is associated with a payment transaction that is fraudulent or associated with a payment transaction that is non-fraudulent; and wherein the detection rate is an indication of a number of data records of the subset of data records from the testing dataset that were correctly predicted to be associated with a payment transaction that is fraudulent.

Clause 8. A system comprising: at least one processor configured to: receive an initial training dataset, wherein the initial training dataset comprises a plurality of data instances, wherein each data instance has a label, and wherein a first percentage of the plurality of data instances are labeled correctly; provide the initial training dataset as an input to a reinforcement learning agent (RLA) machine learning model to generate a second training dataset, wherein the second training dataset comprises the plurality of data instances, wherein a second percentage of the plurality of data instances are labeled correctly, and wherein the second percentage is greater than the first percentage; train a deep learning model using the second training dataset to provide a trained deep learning model; test the trained deep learning model using a testing dataset to generate a resultant dataset, wherein the resultant dataset has a detection rate, and wherein the detection rate is an indication of a number of data instances from the testing dataset that were predicted correctly by the trained deep learning model; and generate a reward parameter based on the detection rate of the resultant dataset.

Clause 9: The system of clause 8, wherein the at least one processor is further configured to: train the RLA machine learning model using a reinforcement based learning algorithm based on the reward parameter.

Clause 10: The system of clauses 8 or 9, wherein, when training the RLA machine learning model using the reinforcement based learning algorithm, the at least one processor is configured to: update parameters of the RLA machine learning model to maximize the reward parameter generated by the trained deep learning model.

Clause 11: The system of any of clauses 8-10, wherein a plurality of data instances of the testing dataset are independent of the plurality of data instances of the initial training dataset.

Clause 12: The system of any of clauses 8-11, wherein the RLA machine learning model comprises a neural network machine learning model.

Clause 13: The system of any of clauses 8-12, wherein the plurality of data instances of the initial training dataset comprises a plurality of data records associated with a plurality of payment transactions; wherein each data record has a label indicating whether the data record is associated with a payment transaction that is fraudulent or associated with a payment transaction that is non-fraudulent; and wherein the deep learning model is a fraud detection deep learning model that is configured to provide a prediction of whether a payment transaction is fraudulent or non-fraudulent.

Clause 14: The system of any of clauses 8-13, wherein a plurality of data instances of the testing dataset comprises a second plurality of data records associated with a second plurality of payment transactions; wherein a subset of data records of the second plurality of data records has a label indicating that each data record of the subset of data records is associated with a payment transaction that is fraudulent or associated with a payment transaction that is non-fraudulent; and wherein the detection rate is an indication of a number of data records of the subset of data records from the testing dataset that were correctly predicted to be associated with a payment transaction that is fraudulent.

Clause 15: A computer program product comprising a non-transitory computer readable medium comprising one or more instructions that, when executed by at least one processor, cause the at least one processor to: receive an initial training dataset, wherein the initial training dataset comprises a plurality of data instances, wherein each data instance has a label, and wherein a first percentage of the plurality of data instances are labeled correctly; provide the initial training dataset as an input to a reinforcement learning agent (RLA) machine learning model to generate a second training dataset, wherein the second training dataset comprises the plurality of data instances, wherein a second percentage of the plurality of data instances are labeled correctly, and wherein the second percentage is greater than the first percentage; train a deep learning model using the second training dataset to provide a trained deep learning model; test the trained deep learning model using a testing dataset to generate a resultant dataset, wherein the resultant dataset has a detection rate, and wherein the detection rate is an indication of a number of data instances from the testing dataset that were predicted correctly by the trained deep learning model; and generate a reward parameter based on the detection rate of the resultant dataset.

Clause 16: The computer program product of clause 15, wherein the one or more instructions further cause the at least one processor to: train the RLA machine learning model using a reinforcement based learning algorithm based on the reward parameter.

Clause 17: The computer program product of clauses 15 or 16, wherein, the one or more instructions that cause the at least one processor to train the RLA machine learning model using the reinforcement based learning algorithm, cause the at least one processor to: update the RLA machine learning model to maximize the reward parameter generated by the trained deep learning model.

Clause 18: The computer program product of any of clauses 15-17, wherein a plurality of data instances of the testing dataset are independent of the plurality of data instances of the initial training dataset.

Clause 19: The computer program product of any of clauses 15-18, wherein the RLA machine learning model comprises a neural network machine learning model.

Clause 20: The computer program product of any of clauses 15-19, wherein the plurality of data instances of the initial training dataset comprises a plurality of data records associated with a plurality of payment transactions; wherein each data record has a label indicating whether the data record is associated with a payment transaction that is fraudulent or associated with a payment transaction that is non-fraudulent; wherein the deep learning model is a fraud detection deep learning model that is configured to provide a prediction of whether a payment transaction is fraudulent or non-fraudulent; wherein a plurality of data instances of the testing dataset comprises a second plurality of data records associated with a second plurality of payment transactions; wherein a subset of data records of the second plurality of data records has a label indicating that each data record of the subset of data records is associated with a payment transaction that is fraudulent or associated with a payment transaction that is non-fraudulent; and wherein the detection rate is an indication of a number of data records of the subset of data records from the testing dataset that were correctly predicted to be associated with a payment transaction that is fraudulent.

These and other features and characteristics of the presently disclosed subject matter, as well as the methods of operation and functions of the related elements of structures and the combination of parts and economies of manufacture, will become more apparent upon consideration of the following description and the appended claims, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments or aspects that are illustrated in the accompanying figures, in which:

FIG. 3 is a flowchart of a non-limiting embodiment or aspect of a process for the use of reinforcement learning to increase machine learning model label accuracy.

DETAILED DESCRIPTION

Figure 1:
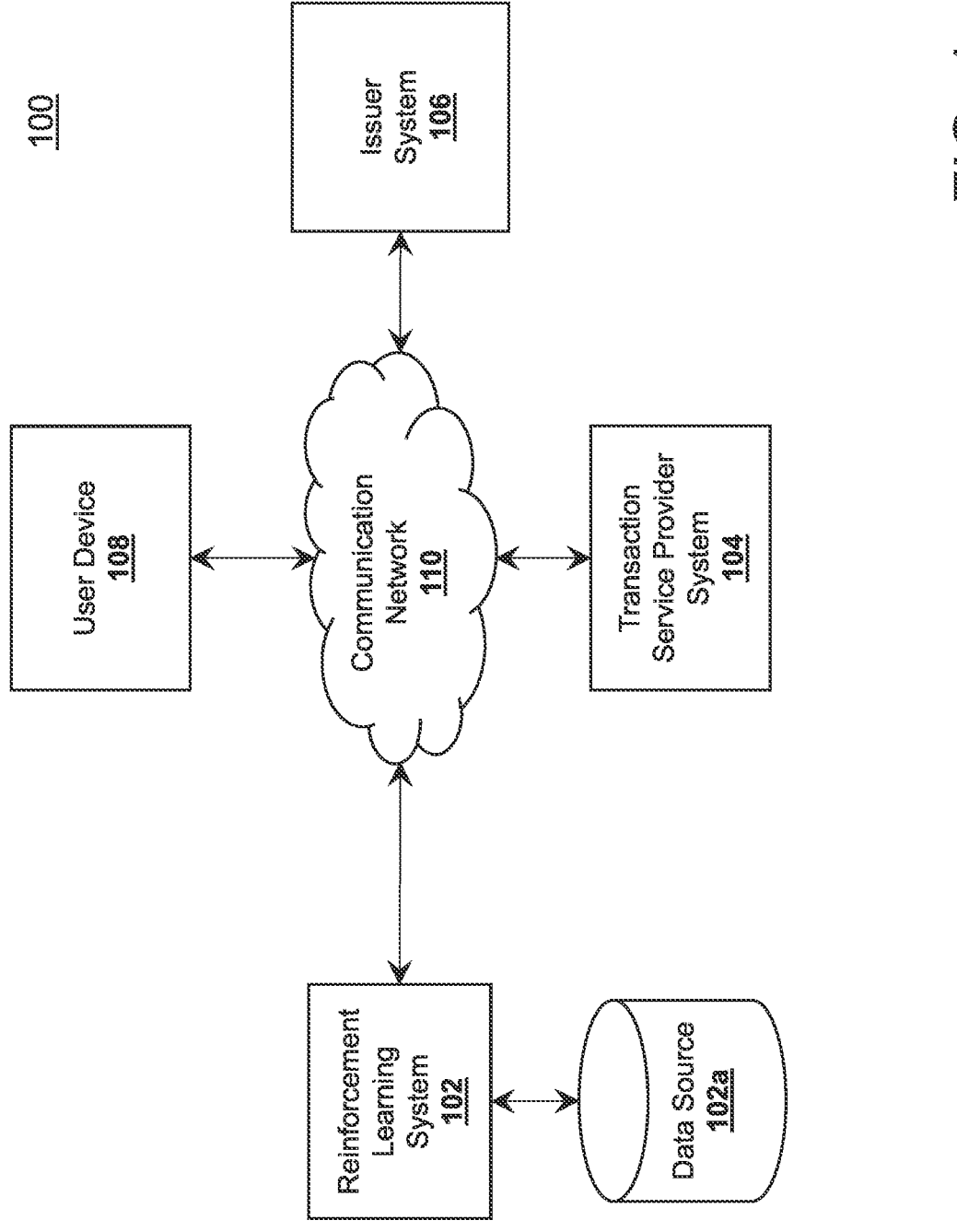
FIG. 1 is a diagram of a non-limiting embodiment or aspect of an environment in which methods, systems, and/or computer program products, described herein, may be implemented according to the principles of the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

Some non-limiting embodiments or aspects may be described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. In addition, reference to an action being "based on" a condition may refer to the action being "in response to" the condition. For example, the phrases "based on" and "in response to" may, in some non-limiting embodiments or aspects, refer to a condition for automatically triggering an action (e.g., a specific operation of an electronic device, such as a computing device, a processor, and/or the like).

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "issuer institution," "payment device issuer," "issuer," or "issuer bank" may refer to one or more entities that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a payment device, such as a physical financial instrument, e.g., a payment card, and/or may be electronic and used for electronic payments. The terms "issuer institution" and "issuer institution system" may also refer to one or more computer systems operated by or on behalf of an issuer institution, such as a server computer executing one or more software applications. For example, an issuer institution system may include one or more authorization servers for authorizing a transaction.

As used herein, the term "account identifier" may include one or more types of identifiers associated with a user account (e.g., a PAN, a card number, a payment card number, a payment token, and/or the like). In some non-limiting embodiments or aspects, an issuer institution may provide an account identifier (e.g., a PAN, a payment token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments or aspects, the account identifier may be an original account identifier, where the original account identifier was provided to a user at the creation of the account associated with the account identifier. In some non-limiting embodiments or aspects, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a payment token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the term "merchant" may refer to one or more entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein, the term "merchant system" may refer to one or more computer systems operated by or on behalf of a merchant, such as a server computer executing one or more software applications. As used herein, the term "product" may refer to one or more goods and/or services offered by a merchant.

As used herein, the term "point-of-sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, the term "point-of-sale (POS) system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and the issuer institution. In some non-limiting embodiments or aspects, a transaction service provider may include a credit card company, a debit card company, and/or the like. As used herein, the term "transaction service provider system" may also refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

As used herein, the term "acquirer" may refer to an entity licensed by the transaction service provider and approved by the transaction service provider to originate transactions (e.g., payment transactions) using a payment device associated with the transaction service provider. As used herein, the term "acquirer system" may also refer to one or more computer systems, computer devices, and/or the like operated by or on behalf of an acquirer. The transactions may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions using a payment device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure that proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitators, and/or the like. In some non-limiting embodiments or aspects, an acquirer may be a financial institution, such as a bank.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Pay®, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "payment device" may refer to an electronic payment device, a portable financial device, a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments or aspects, the payment device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of payment devices managed by a transaction service provider. As used herein, the term "payment gateway system" may refer to one or more computer systems, computer devices, servers, groups of servers, and/or the like operated by or on behalf of a payment gateway and/or to a payment gateway itself. As used herein, the term "payment gateway mobile application" may refer to one or more electronic devices and/or one or more software applications configured to provide payment services for transactions (e.g., payment transactions, electronic payment transactions, and/or the like).

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments or aspects, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "computing device" may refer to one or more electronic devices that are configured to process data. A computing device may be a mobile device, a desktop computer, and/or any other like device. Furthermore, the term "computer" may refer to any computing device that includes the necessary components to receive, process, and output data, and normally includes a display, a processor, a memory, an input device, and a network interface. As used herein, the term "server" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, such as POS devices, directly or indirectly communicating in the network environment may constitute a "system," such as a merchant's POS system.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system."

As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different device, server, or processor, and/or a combination of devices, servers, and/or processors. For example, as used in the specification and the claims, a first device, a first server, or a first processor that is recited as performing a first step or a first function may refer to the same or different device, server, or processor recited as performing a second step or a second function.

Non-limiting embodiments or aspects of the disclosed subject matter are directed to methods, systems, and computer program products for use of reinforcement learning to increase machine learning model label accuracy. In some non-limiting embodiments or aspects, a reinforcement learning system may be configured to receive an initial training dataset, wherein the initial training dataset comprises a plurality of data instances, wherein each data instance has a label, and wherein a first percentage of the plurality of data instances are labeled correctly, provide the initial training dataset as an input to a reinforcement learning agent (RLA) machine learning model to generate a second training dataset, wherein the second training dataset comprises the plurality of data instances, wherein a second percentage of the plurality of data instances are labeled correctly, and wherein the second percentage is greater than the first percentage, train a deep learning model using the second training dataset to provide a trained deep learning model, test the trained deep learning model using a testing dataset to generate a resultant dataset, wherein the resultant dataset has a detection rate, and wherein the detection rate is an indication of a number of data instances from the testing dataset that were predicted correctly by the trained deep learning model, and generate a reward parameter based on the detection rate of the resultant dataset.

In some non-limiting embodiments or aspects, the reinforcement learning system may be configured to train the RLA machine learning model using a reinforcement based learning algorithm based on the reward parameter. In some non-limiting embodiments or aspects, when training the RLA machine learning model using the reinforcement based learning algorithm, the reinforcement learning system may update parameters of the RLA machine learning model to maximize the reward parameter generated by the trained deep learning model. In some non-limiting embodiments or aspects, a plurality of data instances of the testing dataset are independent of the plurality of data instances of the initial training dataset. In some non-limiting embodiments or aspects, the RLA machine learning model comprises a neural network machine learning model. In some non-limiting embodiments or aspects, the plurality of data instances of the initial training dataset comprises a plurality of data records associated with a plurality of payment transactions. In some non-limiting embodiments or aspects, each data record has a label indicating whether the data record is associated with a payment transaction that is fraudulent or associated with a payment transaction that is non-fraudulent. In some non-limiting embodiments or aspects, the deep learning model is a fraud detection deep learning model that is configured to provide a prediction of whether a payment transaction is fraudulent or non-fraudulent.

In some non-limiting embodiments or aspects, a plurality of data instances of the testing dataset comprises a second plurality of data records associated with a second plurality of payment transactions. In some non-limiting embodiments or aspects, a subset of data records of the second plurality of data records has a label indicating that each data record of the subset of data records is associated with a payment transaction that is fraudulent or associated with a payment transaction that is non-fraudulent. In some non-limiting embodiments or aspects, the detection rate is an indication of a number of data records of the subset of data records from the testing dataset that were correctly predicted to be associated with a payment transaction that is fraudulent.

In this way, non-limiting embodiments or aspects of the present disclosure provide a reinforcement learning system which may provide a dataset that reduces a number of incorrect predictions, which may be used to increase the accuracy of predictions provided by a machine learning model, such as deep learning fraud detection model. Furthermore, reinforcement learning system may reduce network resources required to eliminate incorrect predictions in a dataset.

For the purpose of illustration, in the following description, while the presently disclosed subject matter is described with respect to methods, systems, and computer program products for use of reinforcement learning to increase machine learning model label accuracy, such as for use during processing payment transactions, one skilled in the art will recognize that the disclosed subject matter is not limited to the non-limiting embodiments or aspects disclosed herein. For example, the methods, systems, and computer program products described herein may be used with a wide variety of settings, such as the use of reinforcement learning to increase machine learning model label accuracy in any suitable setting, e.g., predictions, regressions, classifications, fraud prevention, authorization, authentication, identification, feature selection, and/or the like.

Referring now to FIG. 1, FIG. 1 is a diagram of an example environment 100 in which devices, systems, and/or methods, described herein, may be implemented. As shown in FIG. 1, environment 100 includes reinforcement learning system 102, data source 102a, transaction service provider system 104, issuer system 106, user device 108, and communication network 110. Reinforcement learning system 102, data source 102a, transaction service provider system 104, issuer system 106, and/or user device 108 may interconnect (e.g., establish a connection to communicate) via wired connections, wireless connections, or a combination of wired and wireless connections.

Reinforcement learning system 102 may include one or more devices configured to communicate with transaction service provider system 104, issuer system 106, and/or user device 108 via communication network 110. For example, reinforcement learning system 102 may include a server, a group of servers, and/or other like devices. In some non-limiting embodiments or aspects, reinforcement learning system 102 may be associated with issuer system 106. For example, reinforcement learning system 102 may be operated by issuer system 106. In another example, reinforcement learning system 102 may be a component of issuer system 106. In some non-limiting embodiments or aspects, reinforcement learning system 102 may be in communication with data source 102a, which may be local or remote to reinforcement learning system 102. In some non-limiting embodiments or aspects, reinforcement learning system 102 may be capable of receiving (e.g., retrieving via a pull) information from, storing information in, transmitting information to, and/or searching information stored in data source 102a.

Transaction service provider system 104 may include one or more devices configured to communicate with reinforcement learning system 102, issuer system 106, and/or user device 108 via communication network 110. In some non-limiting embodiments or aspects, transaction service provider system 104 may include a server, a group of servers, and/or other like devices. In some non-limiting embodiments or aspects, transaction service provider system 104 is associated with an issuer. For example, transaction service provider system 104 may be operated by an issuer.

Issuer system 106 may include one or more devices configured to communicate with reinforcement learning system 102, transaction service provider system 104, and/or user device 108 via communication network 110. For example, issuer system 106 may include a computing device, such as a server, a group of servers, and/or other like devices. In some non-limiting embodiments or aspects, issuer system 106 may be associated with a transaction service provider system.

User device 108 may include a computing device configured to communicate with reinforcement learning system 102, transaction service provider system 104, and/or issuer system 106 via communication network 110. For example, user device 108 may include a computing device, such as a desktop computer, a portable computer (e.g., tablet computer, a laptop computer, and/or the like), a mobile device (e.g., a cellular phone, a smartphone, a personal digital assistant, a wearable device, and/or the like), and/or other like devices. In some non-limiting embodiments or aspects, user device 108 may be associated with a user (e.g., an individual operating user device 108).

Communication network 110 may include one or more wired and/or wireless networks. For example, communication network 110 may include a cellular network (e.g., a long-term evolution (LTE) network, a third-generation (3G) network, a fourth-generation (4G) network, a fifth-generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN) and/or the like), a private network, an ad hoc network, an intranet, the Internet, a fiber optic-based network, a cloud computing network, and/or the like, and/or a combination of some or all of these or other types of networks.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of environment 100 may perform one or more functions described as being performed by another set of systems or another set of devices of environment 100.

Figure 2:
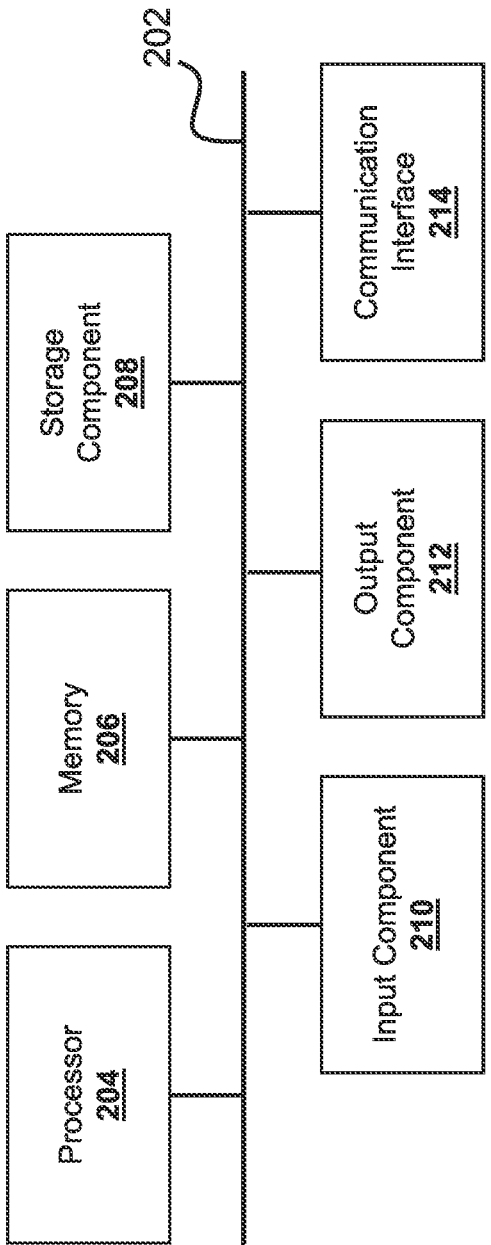
FIG. 2 is a diagram of a non-limiting embodiment or aspect of components of one or more devices of FIG. 1.

Referring now to FIG. 2, FIG. 2 is a diagram of example components of a device 200. Device 200 may correspond to one or more devices of reinforcement learning system 102 (e.g., one or more devices of reinforcement learning system 102), transaction service provider system 104 (e.g., one or more devices of transaction service provider system 104), issuer system 106, and/or user device 108. In some non-limiting embodiments or aspects, reinforcement learning system 102, transaction service provider system 104, issuer system 106, and/or user device 108 may include at least one device 200 and/or at least one component of device 200.

As shown in FIG. 2, device 200 may include bus 202, processor 204, memory 206, storage component 208, input component 210, output component 212, and communication interface 214. Bus 202 may include a component that permits communication among the components of device 200. In some non-limiting embodiments or aspects, processor 204 may be implemented in hardware, firmware, or a combination of hardware and software. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 206 may include random access memory (RAM), read-only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, a camera, and/or the like). Additionally or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software. The term "configured to," as used herein, may refer to an arrangement of software, device(s), and/or hardware for performing and/or enabling one or more functions (e.g., actions, processes, steps of a process, and/or the like). For example, "a processor configured to" may refer to a processor that executes software instructions (e.g., program code) that cause the processor to perform one or more functions.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Referring now to FIG. 3, FIG. 3 is a flowchart of a non-limiting embodiment or aspect of a process 300 for the use of reinforcement learning to increase machine learning model label accuracy. In some non-limiting embodiments or aspects, one or more of the steps of process 300 may be performed (e.g., completely, partially, etc.) by reinforcement learning system 102 (e.g., one or more devices of reinforcement learning system 102). In some non-limiting embodiments or aspects, one or more of the steps of process 300 may be performed (e.g., completely, partially, etc.) by another device or a group of devices separate from or including reinforcement learning system 102 (e.g., one or more devices of reinforcement learning system 102), transaction service provider system 104 (e.g., one or more devices of transaction service provider system 104), issuer system 106 (e.g., one or more devices of issuer system 106), and/or user device 108.

As shown in FIG. 3, at step 302, process 300 includes receiving an initial training dataset that includes a percentage of data instances labeled correctly. For example, reinforcement learning system 102 may receive the initial training dataset that includes a percentage of data instances labeled correctly. In some non-limiting embodiments or aspects, the initial training dataset may include a plurality of data instances (e.g., data records), where each data instance has a label. For example, the initial training dataset may include a plurality of data instances, where each data instance has a label indicating whether the data instance is associated with a non-fraudulent data instance (e.g., a data instance associated with a non-fraudulent payment transaction) or a fraudulent data instance (e.g., a data instance associated with fraudulent payment transaction). In some non-limiting embodiments or aspects, the initial training dataset includes a plurality of data records associated with a plurality of payment transactions, wherein each data record has a label indicating whether the data record is associated with a payment transaction that is fraudulent or associated with a payment transaction that is non-fraudulent.

In some non-limiting embodiments or aspects, a data instance that is labeled correctly may include a data instance that is a verified (e.g., reported as, reported by entity of a payment network as, such as reported by transaction service provider system 104, issuer system 106, etc.) non-fraudulent data instance associated with a transaction and/or a verified fraudulent data instance associated with a transaction. In some non-limiting embodiments or aspects, the initial training dataset may include a plurality of data instances that are incompletely labeled, such as a plurality of data instances that are not verified as non-fraudulent data instances associated with a transaction and/or a plurality of data instances that are not verified as fraudulent data instances associated with a transaction. In some non-limiting embodiments or aspects, the initial training dataset may include a plurality of data instances that are incorrectly labeled, such as a plurality of data instances that are not labeled as non-fraudulent data instances associated with a transaction but should be labeled as fraudulent data instances associated with a transaction and/or a plurality of data instances that are labeled as fraudulent data instances associated with a transaction but should be labeled as non-fraudulent data instances associated with a transaction.

In some examples, the initial training dataset may include a large amount of labeled data instances, such as 100 data instances, 500 data instances, 1,000 data instances, 5,000 data instances, 10,000 data instances, 25,000 data instances, 50,000 data instances, 100,000 data instances, 1,000,000 data instances, and/or the like. In some non-limiting embodiments or aspects, a percentage (e.g., a first percentage) of the plurality of data instances are labeled correctly (e.g., labeled correctly with a positive label of a binary classification, labeled correctly with a negative label of a binary classification, etc.). In some non-limiting embodiments or aspects, the plurality of data instances are labeled based on labels provided as an output of a deep learning model (e.g., a deep learning fraud detection model).

In some non-limiting embodiments or aspects, reinforcement learning system 102 may receive the initial training dataset from data source 102a. Additionally or alternatively, model management system 102 may receive the initial training dataset from transaction service provider system 104, issuer system 106, user device 108, or other systems or devices. In some non-limiting embodiments or aspects, the initial dataset may include a plurality of historical data instances. In some non-limiting embodiments or aspects, the initial dataset may include data (e.g., transaction data) associated with historical payment transactions that were conducted using one or more payment processing networks (e.g., one or more payment processing networks associated with transaction service provider system 104).

In some non-limiting embodiments or aspects, the initial dataset may include a plurality of data instances associated with a plurality of features. In some non-limiting embodiments or aspects, the plurality of data instances may represent a plurality of transactions (e.g., electronic payment transactions) conducted by one or more accountholders (e.g., one or more users, such as a user associated with user device 108).

In some non-limiting embodiments or aspects, a data instance (e.g., a data instance of a dataset, such as an initial training dataset, a second training dataset, or a testing dataset) may include transaction data associated with a payment transaction. In some non-limiting embodiments or aspects, the transaction data may include a plurality of transaction parameters associated with an electronic payment transaction. In some non-limiting embodiments or aspects, the plurality of features may represent the plurality of transaction parameters. In some non-limiting embodiments or aspects, the plurality of transaction parameters may include electronic wallet card data associated with an electronic card (e.g., an electronic credit card, an electronic debit card, an electronic loyalty card, and/or the like), decision data associated with a decision (e.g., a decision to approve or deny a transaction authorization request), authorization data associated with an authorization response (e.g., an approved spending limit, an approved transaction value, and/or the like), a PAN, an authorization code (e.g., a PIN, etc.), data associated with a transaction amount (e.g., an approved limit, a transaction value, etc.), data associated with a transaction date and time, data associated with a conversion rate of a currency, data associated with a merchant type (e.g., a merchant category code that indicates a type of goods, such as grocery, fuel, and/or the like), data associated with an acquiring institution country, data associated with an identifier of a country associated with the PAN, data associated with a response code, data associated with a merchant identifier (e.g., a merchant name, a merchant location, and/or the like), data associated with a type of currency corresponding to funds stored in association with the PAN, and/or the like.

As shown in FIG. 3, at step 304, process 300 includes generating a second training dataset that includes a greater percentage of data instances labeled correctly than the initial training dataset. For example, reinforcement learning system 102 may generate the second training dataset that includes a greater percentage of data instances labeled correctly than the initial training dataset. In some non-limiting embodiments or aspects, reinforcement learning system 102 may provide the initial training dataset (e.g., all data instances of the initial training dataset, a subset of all data instances of the initial training dataset, etc.) as an input to a reinforcement learning agent (RLA) machine learning model to generate a second training dataset (e.g., an enhanced training dataset). For example, reinforcement learning system 102 may provide each data instance of the initial training dataset as an input to the RLA machine learning model, and the RLA machine learning model may generate an output based on the input. In some non-limiting embodiments or aspects, the output of the RLA machine learning model may include a label for a data instance provided as an input. For example, the output of the RLA machine learning model may include a label indicating whether the data instance is predicted to be a non-fraudulent data instance (e.g., a data instance associated with a non-fraudulent payment transaction) or a fraudulent data instance (e.g., a data instance associated with fraudulent payment transaction). In some non-limiting embodiments or aspects, the RLA machine learning model may include a neural network machine learning model. In some non-limiting embodiments or aspects, the RLA machine learning model may include a neural network machine learning model having a large number of nodes. For example, the RLA machine learning model may include a neural network machine learning model having 10 nodes, 20 nodes, 50 nodes, 100 nodes, 1,000 nodes, and/or the like.

In some non-limiting embodiments or aspects, the second training dataset includes a plurality of data instances, where each data instance has a label. For example, the second training dataset may include a plurality of data instances, where each data instance has a label indicating whether the data instance is associated with a non-fraudulent data instance (e.g., a data instance associated with a non-fraudulent payment transaction) or a fraudulent data instance (e.g., a data instance associated with a fraudulent payment transaction). In some non-limiting embodiments or aspects, the second training dataset includes a plurality of data records associated with a plurality of payment transactions, wherein each data record has a label indicating whether the data record is associated with a payment transaction that is fraudulent or associated with a payment transaction that is non-fraudulent.

In some examples, the second training dataset includes the same plurality of data instances of the initial dataset, and the labels of the second training dataset may be different from the labels of the initial training dataset (e.g., one or more labels of the second training dataset may be different from one or more labels of the initial training dataset). In such an example, a percentage (e.g., a second percentage) of the plurality of data instances of the second dataset are labeled correctly. In some non-limiting embodiments or aspects, the percentage of the plurality of data instances of the second dataset that are labeled correctly is greater than the percentage of the plurality of data instances of the initial dataset that are labeled correctly.

As shown in FIG. 3, at step 306, process 300 includes training a deep learning model based on the second training dataset. For example, reinforcement learning system 102 may train the deep learning model (e.g., the deep learning model that was used to label the plurality of data instances of the initial training dataset) based on the second training dataset. In some non-limiting embodiments or aspects, reinforcement learning system 102 may train the deep learning model by providing each data instance of the second training dataset as an input and generating an output based on the input. In some non-limiting embodiments or aspects, the output of the deep learning model may include a label indicating whether the data instance is predicted to be a non-fraudulent data instance (e.g., a data instance associated with a non-fraudulent payment transaction) or a fraudulent data instance (e.g., a data instance associated with a fraudulent payment transaction). In some non-limiting embodiments or aspects, reinforcement learning system 102 may train the deep learning model based on a loss function. In some non-limiting embodiments or aspects, the deep learning model is a fraud detection deep learning model that is configured to provide a prediction of whether a payment transaction is fraudulent or non-fraudulent. In some non-limiting embodiments or aspects, the deep learning model may include a neural network machine learning model having a large number of nodes. For example, the deep learning model may include a neural network machine learning model having 10 nodes, 20 nodes, 50 nodes, 100 nodes, 1,000 nodes, and/or the like.

In some non-limiting embodiments or aspects, reinforcement learning system 102 may initialize parameters of the RLA machine learning model. For example, reinforcement learning system 102 may initialize the parameters of the RLA machine learning model based on (e.g., with numbers from) a standard normal distribution. In some non-limiting embodiments or aspects, reinforcement learning system 102 may train the deep learning model based on initializing the parameters of the RLA machine learning model.

In some non-limiting embodiments or aspects, reinforcement learning system 102 may train the deep learning model based on a second training dataset each time reinforcement learning system 102 generates a second training dataset based on the initial training dataset. For example, reinforcement learning system 102 may update (e.g., train, re-train, test, and/or validate, etc.) the RLA machine learning model based on a reward parameter each time a reward parameter is generated, and reinforcement learning system 102 may generate a second training dataset using the updated RLA machine learning model based on the initial training dataset each time the RLA machine learning model is updated.

As shown in FIG. 3, at step 308, process 300 includes generating a resultant dataset that has a detection rate using the trained deep learning model. For example, reinforcement learning system 102 may generate the resultant dataset that has a detection rate using the trained deep learning model. In some non-limiting embodiments or aspects, the detection rate may be an indication of a number of data instances from the testing dataset that were predicted correctly by the trained deep learning model. In some non-limiting embodiments or aspects, reinforcement learning system 102 may test the trained deep learning model using a testing dataset. For example, reinforcement learning system 102 may test the deep learning model using a testing dataset that includes a plurality of data instances (e.g., a plurality of data records), where each data instance has a label. In some non-limiting embodiments or aspects, the testing dataset may include a plurality of data instances, where each data instance has a label indicating whether the data instance is associated with a non-fraudulent data instance (e.g., a data instance associated with a non-fraudulent payment transaction) or a fraudulent data instance (e.g., a data instance associated with a fraudulent payment transaction). In some non-limiting embodiments or aspects, the testing dataset may include a plurality of data instances, where each data instance has a label indicating that the data instance is associated with a fraudulent data instance.

In some non-limiting embodiments or aspects, the testing dataset includes a plurality of data records associated with a plurality of payment transactions, wherein each data record has a label indicating whether the data record is associated with a payment transaction that is fraudulent or associated with a payment transaction that is non-fraudulent. In some non-limiting embodiments or aspects, the testing dataset includes a plurality of data records associated with a plurality of payment transactions, wherein each data record has a label indicating that the data record is associated with a payment transaction that is fraudulent.

In one example, reinforcement learning system 102 may provide each data instance of the plurality of data instances as an input to the deep learning model and generate an output of the deep learning model based on the input. In some non-limiting embodiments or aspects, the output may include a label for a corresponding input. In some non-limiting embodiments or aspects, the resultant dataset may include the outputs based on each data instance of the plurality of data instances of the testing dataset, and the outputs of the deep learning model may include a label indicating whether the data instance is predicted to be a non-fraudulent data instance (e.g., a data instance associated with a non-fraudulent payment transaction) or a fraudulent data instance (e.g., a data instance associated with a fraudulent payment transaction). In some non-limiting embodiments or aspects, the plurality of data instances of the testing dataset are independent of the plurality of data instances of the initial training dataset. For example, all data instances of the plurality of data instances of the testing dataset may be different from all data instances of the plurality of data instances of the initial training dataset. In some examples, all data instances of the plurality of data instances of the testing dataset may be associated with payment transactions that are different from payment transactions associated with all data instances of the plurality of data instances of the initial training dataset.

In some non-limiting embodiments or aspects, reinforcement learning system 102 may determine whether the deep learning model correctly labeled each data instance in the resultant dataset. For example, reinforcement learning system 102 may compare the labels of the plurality of data instances of the testing dataset to the labels of the plurality of data instances of the resultant dataset. In such an example, if reinforcement learning system 102 determines that a label of a data instance of the testing dataset matches a label of a corresponding data instance of the resultant dataset, then reinforcement learning system 102 may determine that the trained deep learning model correctly predicted (e.g., correctly predicted a label of) the corresponding data instance of the resultant dataset. In some non-limiting embodiments or aspects, reinforcement learning system 102 may determine a detection rate of the resultant dataset by comparing a number of data instances of the resultant dataset that the trained deep learning model correctly predicted to a total number of data instances of the resultant dataset. In one example, reinforcement learning system 102 may calculate the detection rate of the resultant dataset as a ratio of a number of data instances of the resultant dataset that the trained deep learning model correctly predicted to a total number of data instances of the resultant dataset.

As shown in FIG. 3, at step 310, process 300 includes generating a reward parameter based on the detection rate. For example, reinforcement learning system 102 may generate the reward parameter based on the detection rate of the resultant dataset. In some non-limiting embodiments or aspects, reinforcement learning system 102 may train the RLA machine learning model based on the reward parameter. For example, reinforcement learning system 102 may train the RLA machine learning model using a reinforcement based learning algorithm based on the reward parameter. In one example, the reinforcement learning algorithm may be defined as follows:

$$R_t = r_{t+1} + \gamma r_{t+2} + \gamma^2 r_{t+3} + \gamma^3 r_{t+4} + \cdots = \sum_{k=0}^{\infty} \gamma^k r_{t+k+1},$$

where $r_{t+1}$ is a predicted fraudulent reward amount associated with a fraudulent payment transaction that will be performed by the agent in the future, and $\gamma$ is a weight parameter with a value range: $0<\gamma<1$. In some non-limiting embodiments or aspects, reinforcement learning system 102 may update the RLA machine learning model (e.g., update parameters, such as weight coefficients, of the RLA machine learning model) to maximize the reward parameter.

In some non-limiting embodiments or aspects, reinforcement learning system 102 may perform an action in real time (e.g., in a live situation, such as a time at which or close to a time at which operations, such as operations of reinforcement learning system 102, are carried out) using a deep learning model (e.g., a trained deep learning model). For example, reinforcement learning system 102 may perform an action based on a label (e.g., a classification label) of an input provided by the deep learning model, wherein the input comprises a data instance associated with a payment transaction conducted in real time. In some non-limiting embodiments or aspects, reinforcement learning system 102 may perform a procedure associated with protection of an account of a user (e.g., a user associated with user device 108) based on the label of the input. For example, if the label of the input indicates that the procedure is necessary, reinforcement learning system 102 may perform the procedure associated protection of the account of the user. In such an example, if the label of the input indicates that the procedure is not necessary, reinforcement learning system 102 may forego performing the procedure associated protection of the account of the user. In some non-limiting embodiments or aspects, reinforcement learning system 102 may execute a fraud protection procedure based on the label of the input.

Referring now to FIGS. 4A-4F, FIGS. 4A-4F are diagrams of a non-limiting embodiment or aspect of implementation 400 relating to a process (e.g., process 300) for the use of reinforcement learning to increase machine learning model label accuracy. In some non-limiting embodiments or aspects, one or more of the steps of the process may be performed (e.g., completely, partially, etc.) by reinforcement learning system 102 (e.g., one or more devices of reinforcement learning system 102). In some non-limiting embodiments or aspects, one or more of the steps of the process may be performed (e.g., completely, partially, etc.) by another device or a group of devices separate from or including reinforcement learning system 102 (e.g., one or more devices of reinforcement learning system 102), transaction service provider system 104 (e.g., one or more devices of transaction service provider system 104), issuer system 106 (e.g., one or more devices of issuer system 106), and/or user device 108.

Figure 4A:
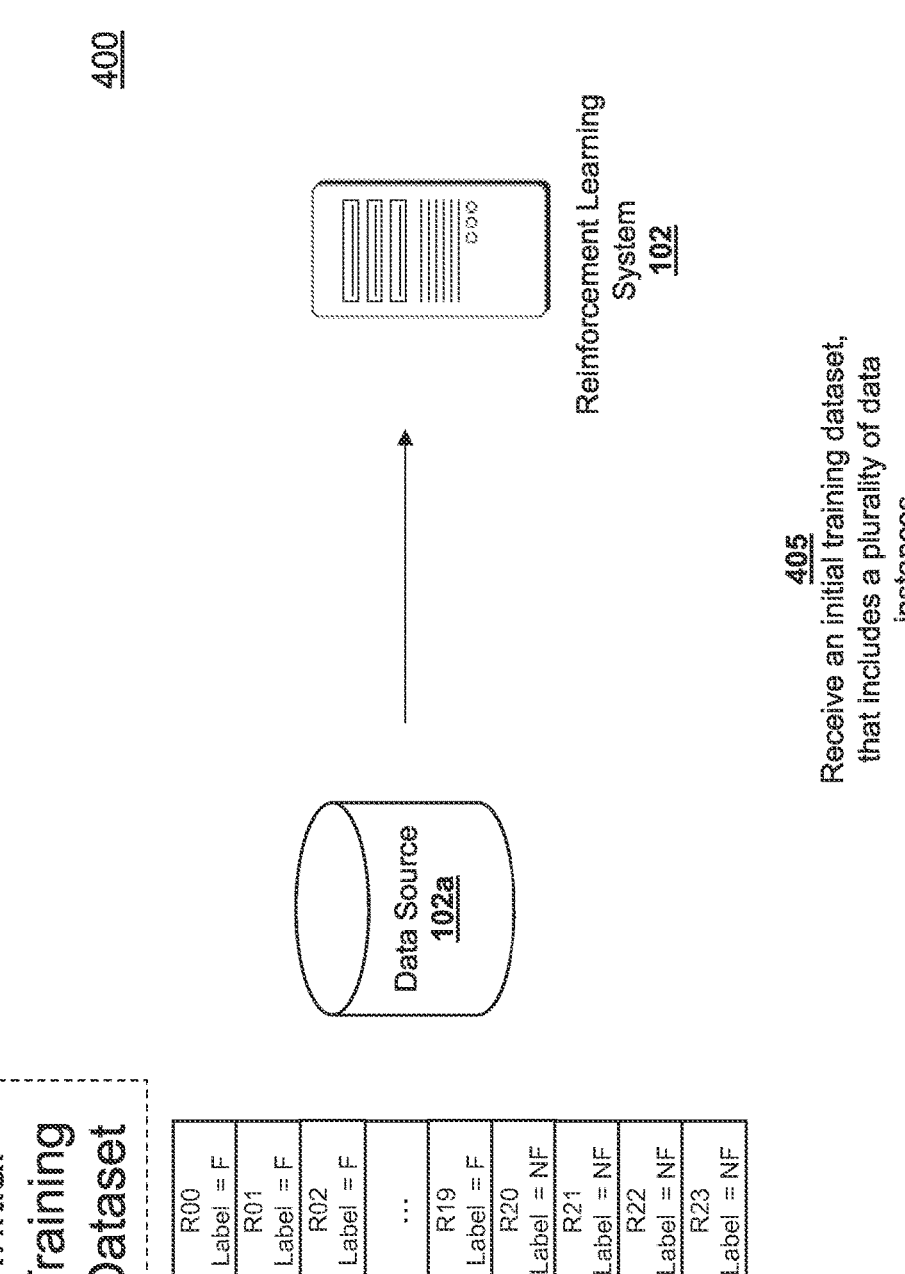
FIGS. 4A-4F are diagrams of non-limiting embodiments or aspects of an implementation of a process for the use of reinforcement learning to increase machine learning model label accuracy according to some non-limiting embodiments or aspects.
Figure 4B:
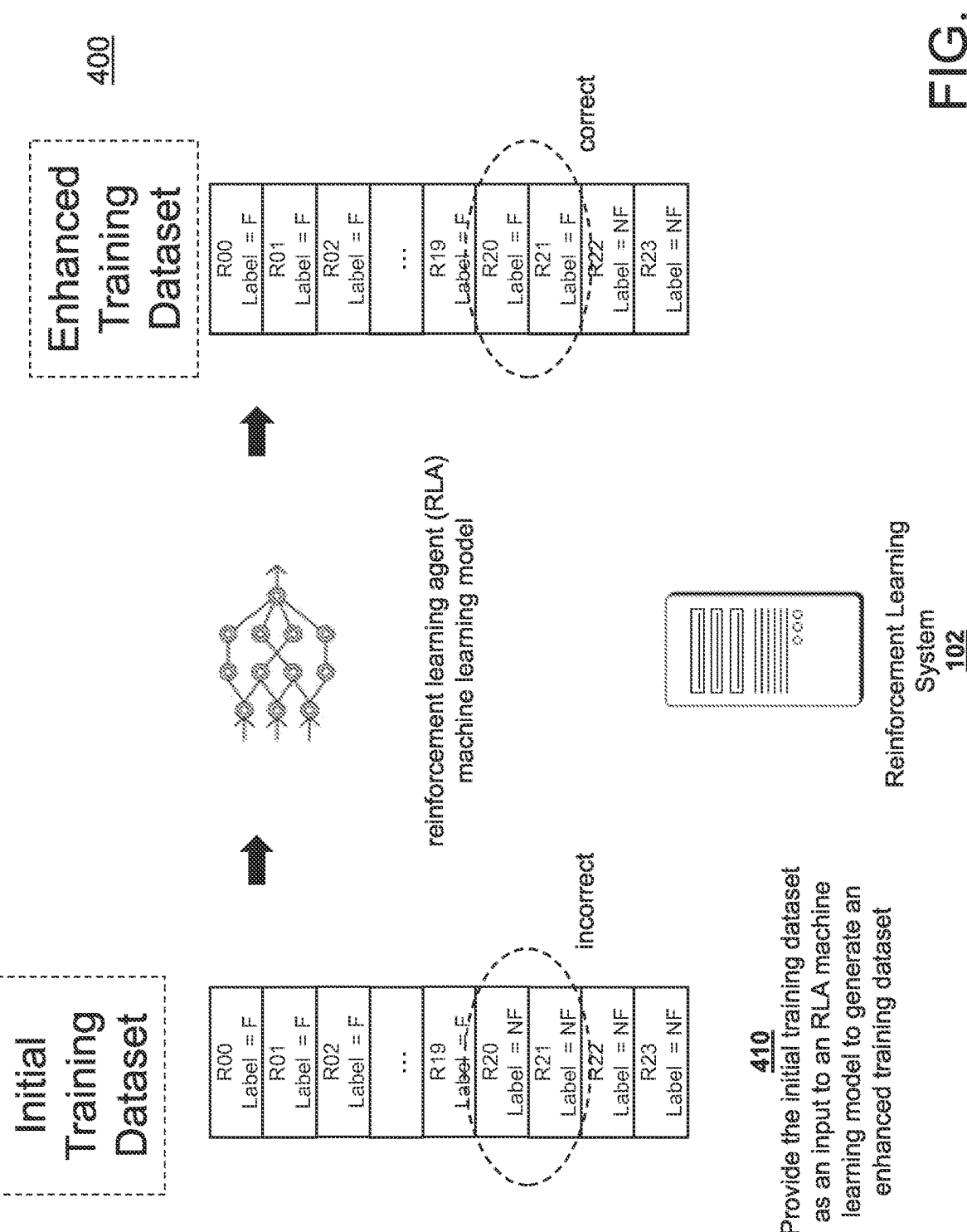

As shown by reference number 405 in FIG. 4A, reinforcement learning system 102 may receive an initial training dataset, that includes a plurality of data instances. In some non-limiting embodiments or aspects, the initial training dataset may include a plurality of data records (e.g., shown as "R00", "R01", "R02", etc.), where each data instance has a label (e.g., shown as "F" for fraudulent and "NF" for non-fraudulent) and a first percentage of the plurality of data records are labeled correctly. As shown by reference number 410 in FIG. 4B, reinforcement learning system 102 may provide the initial training dataset as an input to an RLA machine learning model to generate an enhanced training dataset. In some non-limiting embodiments or aspects, reinforcement learning system 102 may generate the second training dataset that includes a greater percentage of data records labeled correctly than the initial dataset.

Figure 4C:
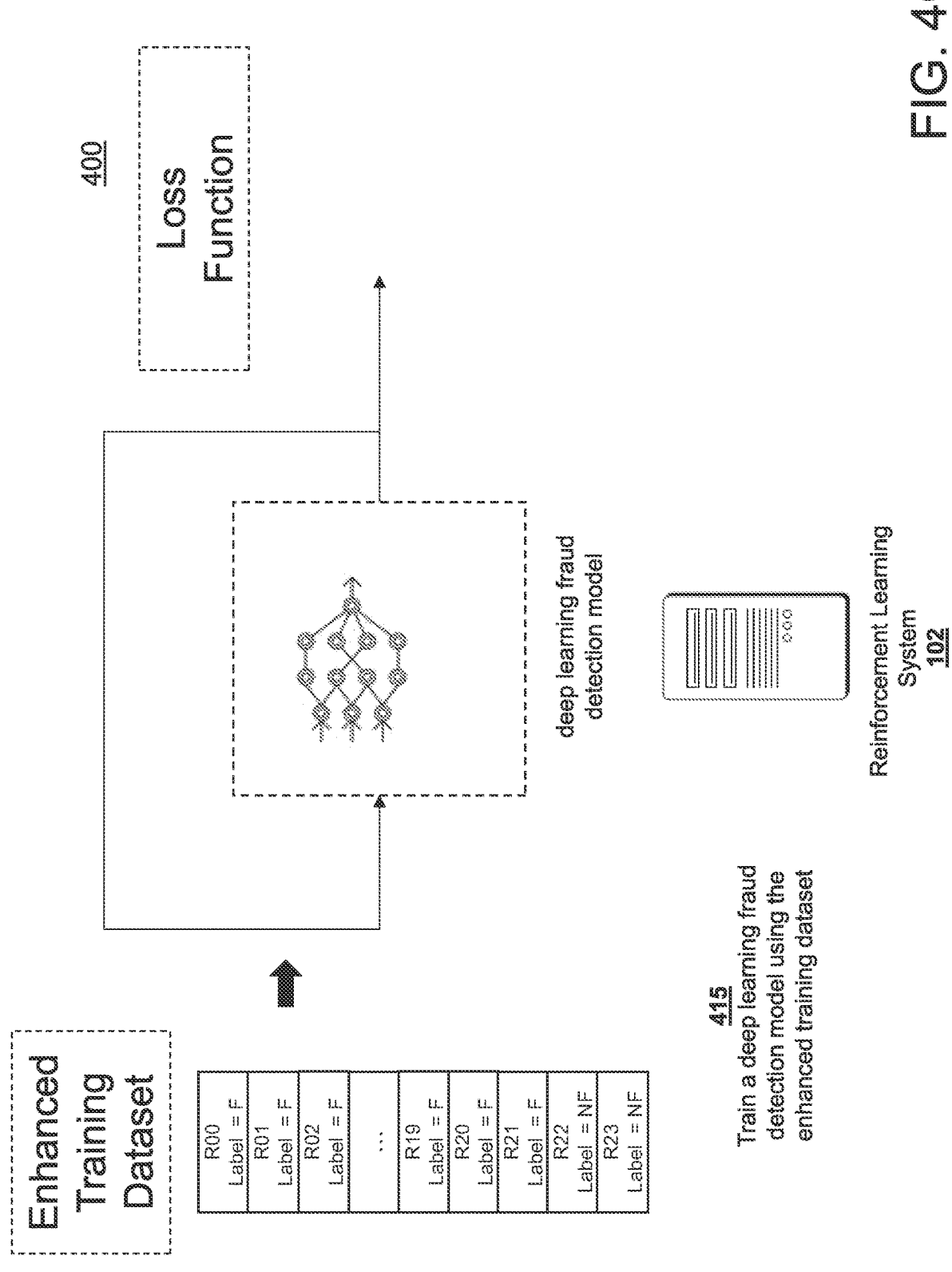
Figure 4D:
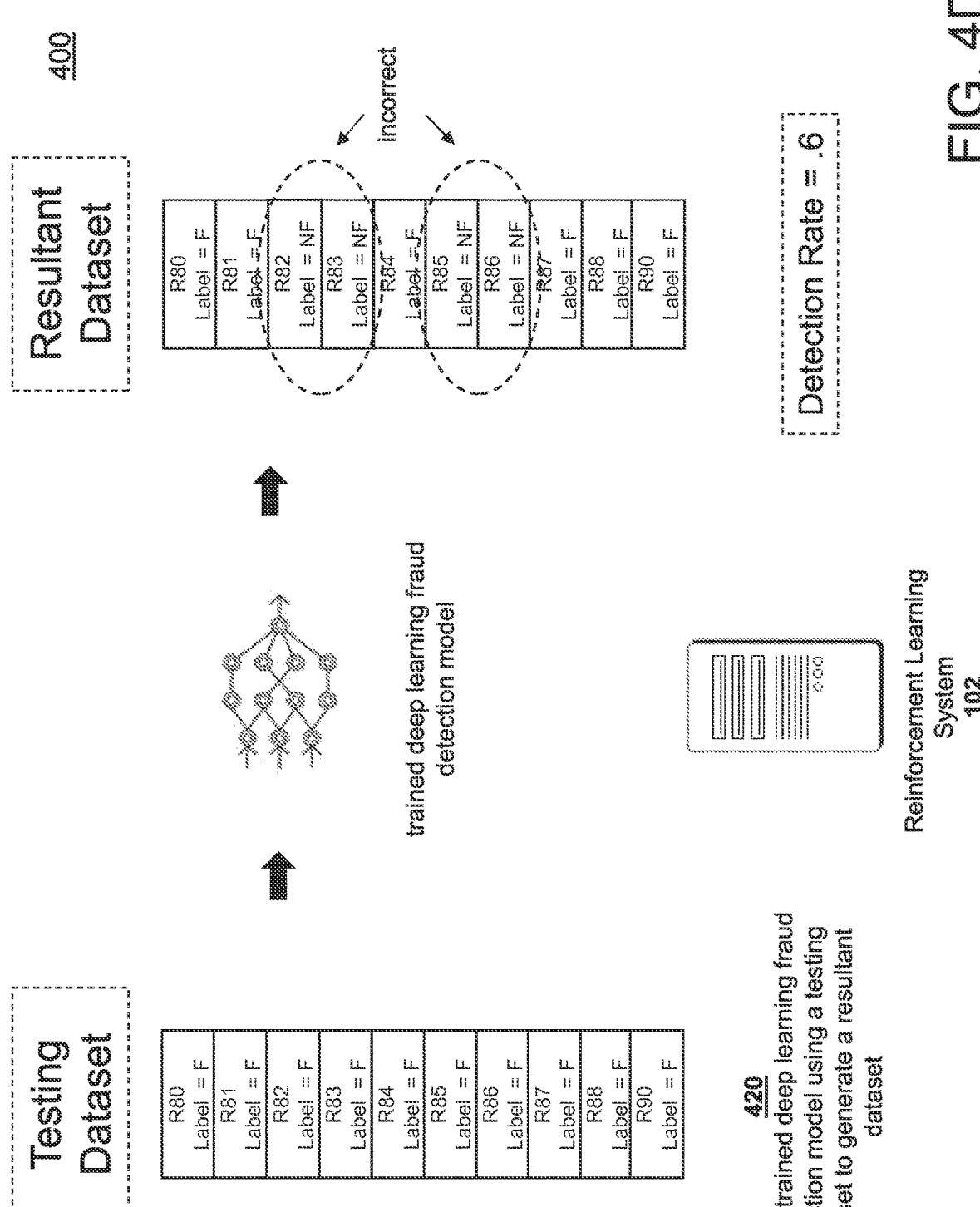

As shown by reference number 415 in FIG. 4C, reinforcement learning system 102 may train a deep learning fraud detection model using the enhanced training dataset. In some non-limiting embodiments or aspects, reinforcement learning system 102 may train the deep learning model by providing each data instance of the second training dataset as an input and generating an output based on the input. In some non-limiting embodiments or aspects, the output of the deep learning model may include a label indicating whether the data record is predicted to be a non-fraudulent data instance (e.g., a data instance associated with a non-fraudulent payment transaction) or a fraudulent data instance (e.g., a data instance associated with a fraudulent payment transaction).

For example, reinforcement learning system 102 may train the deep learning model based on a loss function. In some non-limiting embodiments or aspects, the deep learning fraud detection model is configured to provide a prediction of whether a payment transaction is fraudulent or non-fraudulent. As shown by reference number 420 in FIG. 4D, reinforcement learning system 102 may test a trained deep learning fraud detection model using a testing dataset to generate a resultant dataset.

Figure 4E:
Figure 4F:
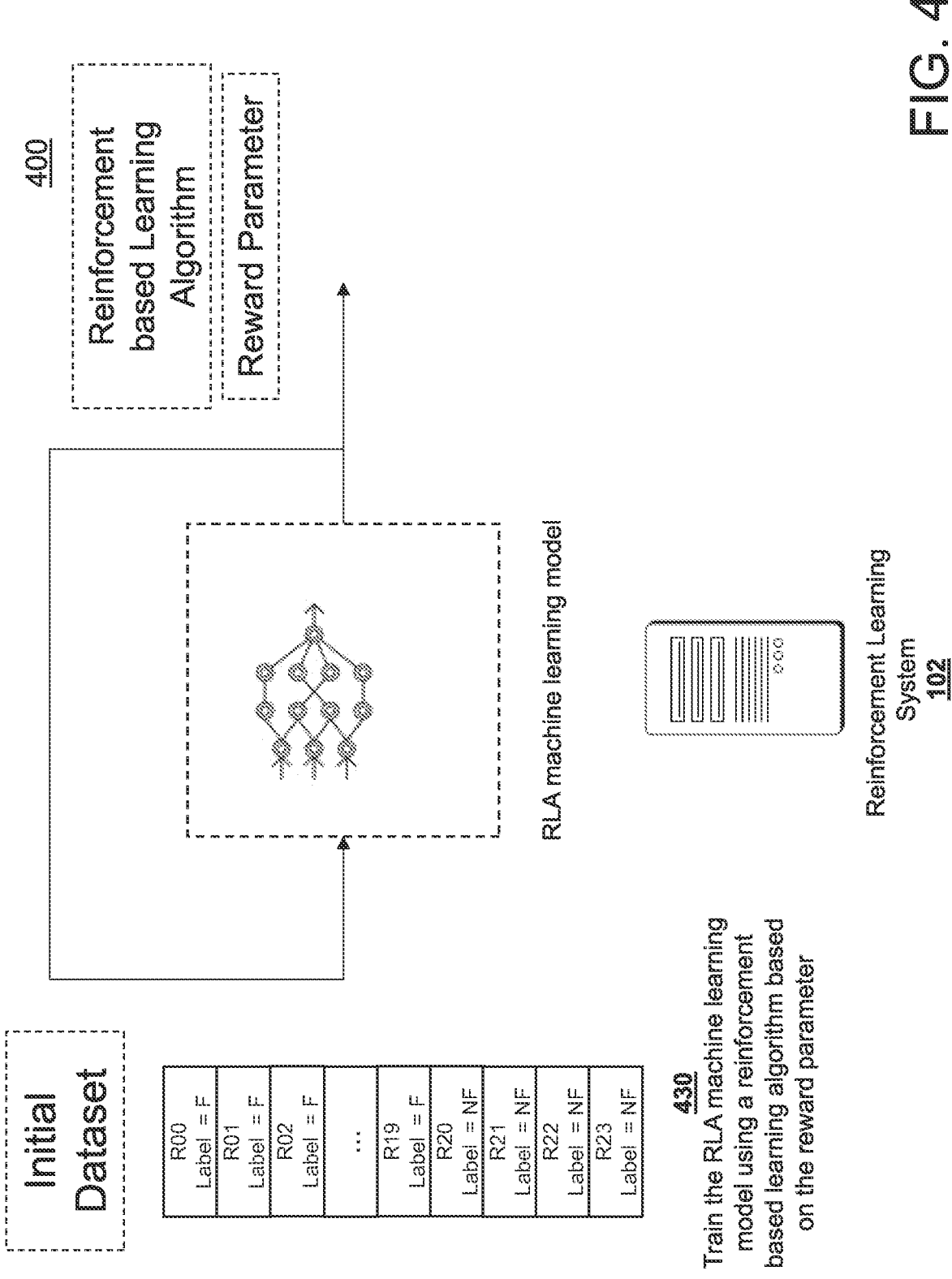

As shown by reference number 425 in FIG. 4E, reinforcement learning system 102 may generate a reward parameter based on the detection rate of the resultant dataset. As shown by reference number 430 in FIG. 4F, reinforcement learning system 102 may train the RLA machine learning model using a reinforcement based learning algorithm based on the reward parameter. In some non-limiting embodiments or aspects, reinforcement learning system 102 may update the RLA machine learning model (e.g., update parameters, such as weight coefficients, of the RLA machine learning model) to maximize the reward parameter.

Although the disclosed subject matter has been described in detail for the purpose of illustration based on what is currently considered to be the most practical and preferred embodiments or aspects, it is to be understood that such detail is solely for that purpose and that the disclosed subject matter is not limited to the disclosed embodiments or aspects, but, on the contrary, is intended to cover modifications and equivalent arrangements that are within the spirit and scope of the appended claims. For example, it is to be understood that the presently disclosed subject matter contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method comprising:

receiving, with at least one processor, an initial training dataset, wherein the initial training dataset comprises a plurality of data instances, wherein each data instance has a label, and wherein a first percentage of the plurality of data instances are labeled correctly;

providing, with at least one processor, the initial training dataset as an input to a reinforcement learning agent (RLA) machine learning model to generate a second training dataset, wherein the second training dataset comprises the plurality of data instances, wherein a second percentage of the plurality of data instances are labeled correctly, and wherein the second percentage is greater than the first percentage;

23 training, with at least one processor, a deep learning model using the second training dataset to provide a trained deep learning model;

testing, with at least one processor, the trained deep learning model using a testing dataset to generate a resultant dataset, wherein the resultant dataset has a detection rate, and wherein the detection rate is an indication of a number of data instances from the testing dataset that were predicted correctly by the trained deep learning model; and generating, with at least one processor, a reward parameter based on the detection rate of the resultant dataset generated using the trained deep learning model.

2. The computer-implemented method of claim 1, further comprising:

training the RLA machine learning model using a reinforcement based learning algorithm based on the reward parameter.

3. The computer-implemented method of claim 2, wherein training the RLA machine learning model using the reinforcement based learning algorithm comprises:

updating the RLA machine learning model to maximize the reward parameter generated by the trained deep learning model.

4. The computer-implemented method of claim 1, wherein a plurality of data instances of the testing dataset are independent of the plurality of data instances of the initial training dataset.

5. The computer-implemented method of claim 1, wherein the RLA machine learning model comprises a neural network machine learning model.

6. The computer-implemented method of claim 1, wherein the plurality of data instances of the initial training dataset comprises a plurality of data records associated with a plurality of payment transactions;

wherein each data record has a label indicating whether the data record is associated with a payment transaction that is fraudulent or associated with a payment transaction that is non-fraudulent; and wherein the deep learning model is a fraud detection deep learning model that is configured to provide a prediction of whether a payment transaction is fraudulent or non-fraudulent.

7. The computer-implemented method of claim 6, wherein a plurality of data instances of the testing dataset comprises a second plurality of data records associated with a second plurality of payment transactions;

wherein a subset of data records of the second plurality of data records has a label indicating that each data record of the subset of data records is associated with a payment transaction that is fraudulent or associated with a payment transaction that is non-fraudulent; and wherein the detection rate is an indication of a number of data records of the subset of data records from the testing dataset that were correctly predicted to be associated with a payment transaction that is fraudulent.

8. A system comprising:

at least one processor configured to:

receive an initial training dataset, wherein the initial training dataset comprises a plurality of data instances, wherein each data instance has a label, and wherein a first percentage of the plurality of data instances are labeled correctly;

provide the initial training dataset as an input to a reinforcement learning agent (RLA) machine learning model to generate a second training dataset, wherein the second training dataset comprises the plurality of data instances, wherein a second percentage of the plurality of data instances are labeled correctly, and wherein the second percentage is greater than the first percentage;

train a deep learning model using the second training dataset to provide a trained deep learning model;

test the trained deep learning model using a testing dataset to generate a resultant dataset, wherein the resultant dataset has a detection rate, and wherein the detection rate is an indication of a number of data instances from the testing dataset that were predicted correctly by the trained deep learning model; and generate a reward parameter based on the detection rate of the resultant dataset.

9. The system of claim 8, wherein the at least one processor is further configured to:

train the RLA machine learning model using a reinforcement based learning algorithm based on the reward parameter.

10. The system of claim 9, wherein, when training the RLA machine learning model using the reinforcement based learning algorithm, the at least one processor is configured to:

update parameters of the RLA machine learning model to maximize the reward parameter generated by the trained deep learning model.

11. The system of claim 8, wherein a plurality of data instances of the testing dataset are independent of the plurality of data instances of the initial training dataset.

12. The system of claim 8, wherein the RLA machine learning model comprises a neural network machine learning model.

13. The system of claim 8, wherein the plurality of data instances of the initial training dataset comprises a plurality of data records associated with a plurality of payment transactions;

wherein each data record has a label indicating whether the data record is associated with a payment transaction that is fraudulent or associated with a payment transaction that is non-fraudulent; and wherein the deep learning model is a fraud detection deep learning model that is configured to provide a prediction of whether a payment transaction is fraudulent or non-fraudulent.

14. The system of claim 13, wherein a plurality of data instances of the testing dataset comprises a second plurality of data records associated with a second plurality of payment transactions;

wherein a subset of data records of the second plurality of data records has a label indicating that each data record of the subset of data records is associated with a payment transaction that is fraudulent or associated with a payment transaction that is non-fraudulent; and wherein the detection rate is an indication of a number of data records of the subset of data records from the testing dataset that were correctly predicted to be associated with a payment transaction that is fraudulent.

15. A computer program product comprising a non-transitory computer readable medium comprising one or more instructions that, when executed by at least one processor, cause the at least one processor to:

receive an initial training dataset, wherein the initial training dataset comprises a plurality of data instances, wherein each data instance has a label, and wherein a first percentage of the plurality of data instances are labeled correctly;

provide the initial training dataset as an input to a reinforcement learning agent (RLA) machine learning model to generate a second training dataset, wherein the second training dataset comprises the plurality of data instances, wherein a second percentage of the plurality of data instances are labeled correctly, and wherein the second percentage is greater than the first percentage;

train a deep learning model using the second training dataset to provide a trained deep learning model;

test the trained deep learning model using a testing dataset to generate a resultant dataset, wherein the resultant dataset has a detection rate, and wherein the detection rate is an indication of a number of data instances from the testing dataset that were predicted correctly by the trained deep learning model; and generate a reward parameter based on the detection rate of the resultant dataset.

16. The computer program product of claim 15, wherein the one or more instructions further cause the at least one processor to:

train the RLA machine learning model using a reinforcement based learning algorithm based on the reward parameter.

17. The computer program product of claim 16, wherein, the one or more instructions that cause the at least one processor to train the RLA machine learning model using the reinforcement based learning algorithm, cause the at least one processor to:

update the RLA machine learning model to maximize the reward parameter generated by the trained deep learning model.

18. The computer program product of claim 15, wherein a plurality of data instances of the testing dataset are independent of the plurality of data instances of the initial training dataset.

19. The computer program product of claim 15, wherein the RLA machine learning model comprises a neural network machine learning model.

20. The computer program product of claim 15, wherein the plurality of data instances of the initial training dataset comprises a plurality of data records associated with a plurality of payment transactions;

wherein each data record has a label indicating whether the data record is associated with a payment transaction that is fraudulent or associated with a payment transaction that is non-fraudulent;

wherein the deep learning model is a fraud detection deep learning model that is configured to provide a prediction of whether a payment transaction is fraudulent or non-fraudulent;

wherein a plurality of data instances of the testing dataset comprises a second plurality of data records associated with a second plurality of payment transactions;

wherein a subset of data records of the second plurality of data records has a label indicating that each data record of the subset of data records is associated with a payment transaction that is fraudulent or associated with a payment transaction that is non-fraudulent; and wherein the detection rate is an indication of a number of data records of the subset of data records from the testing dataset that were correctly predicted to be associated with a payment transaction that is fraudulent.

\* \* \* \* \*